Jan. 7, 1958        N. C. ZATSKY        2,818,743
MOTION TRANSFORMING APPARATUS
Filed May 10, 1954
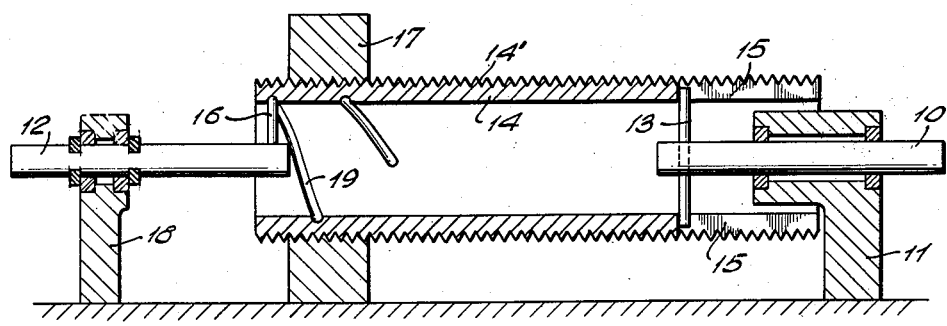
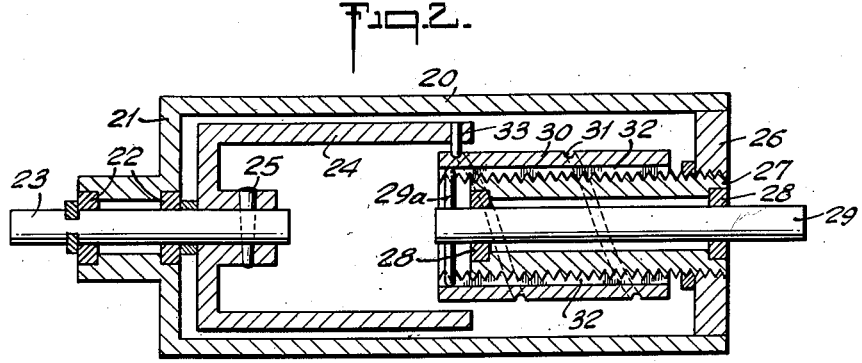
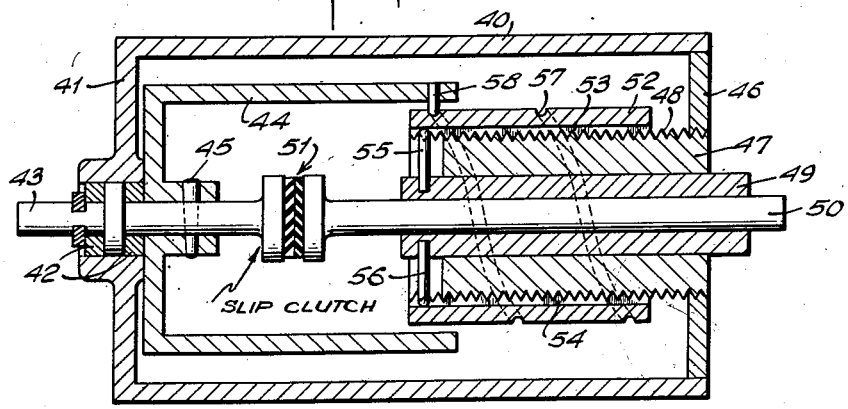
INVENTOR
NORMAN C. ZATSKY
BY
Burgess, Ryan & Hicks
ATTORNEY United States Patent Office 2,818,743
Patented Jan. 7, 1958

2,818,743

MOTION TRANSFORMING APPARATUS

Norman C. Zatsky, Valley Stream, N. Y., assignor to Reeves Instrument Corporation, New York, N. Y., a corporation of New York Application May 10, 1954, Serial No. 428,716

11 Claims. (Cl. 74—393)

This invention relates to a motion transforming system and more specifically concerns a new and improved apparatus for modifying or transforming angular motion into an angular function thereof.

While many forms of gear trains and other mechanical motion transmitting devices have been developed to modify angular motion, such devices, particularly in instances where complicated functions were to be reproduced, resulted in cumbersome and intricate assemblies useful only for the specific application for which they were designed. Such apparatus was of course costly and in many cases only approximate results were obtainable.

This invention overcomes the problems heretofore encountered and provides a highly simplified basic arrangement of elements for modifying angular motion that may be readily and easily adapted to a wide variety of motion transformations. Because of the inherent nature of the structure, relatively high accuracies are obtainable whether the invention is utilized for light loads or for the transmission of substantial quantities of power. These ends are attained through the use of an improved rotary cam and cam follower assembly coupling a pair of shafts and which responds to the motion of one shaft to rotate the other shaft in accordance with a predetermined function. As an example of the many applications, let it be assumed that a potentiometer having a uniform resistance taper is to be used in a circuit where resistance must vary logarithmically with uniform rotation. Instead of employing a specially wound potentiometer for the purpose, this invention may be used between a driving shaft and the potentiometer shaft to effect the same ends as a logarithmically wound potentiometer. Similarly more complicated functions could be reproduced so that a given potentiometer may be operated to provide a desired change in resistance in response to uniform or non-uniform angular motion which in many cases could not be obtained easily if at all with specially wound potentiometers.

Another advantage of the invention resides in its simplicity, dependability and effectiveness. It provides a direct transformation of motion by means of a minimum of critical components with the result that high degrees of accuracy are readily and easily attainable.

The above and other objects and advantages of the invention will become more apparent from the following description and accompanying drawings forming part of this application.

In the figures:

Fig. 1 is a diagrammatic view in section of one embodiment of the invention to illustrate the principle thereof;

Fig. 2 is a cross sectional view of a modified embodiment of the invention; and

Fig. 3 is a cross sectional view of another embodiment of the invention.

The motion transforming apparatus or function adaptor according to the invention comprsies in one form three relatively movable elements coupled one with the others to effect the desired modification of angular motion. For illustrative purposes a somewhat diagrammatic embodiment is shown in Fig. 1 which includes an input shaft 10, an output shaft 12, a traveling cylindrical cam 14 and a cam follower 16. More specifically the input or driver shaft 10 is suitably journaled in a fixed member or post 11 and carries on its inner end a transverse driving pin 13. This pin engages a pair of oppositely disposed longitudinal slots 15 in the traveling cam 14 having an external thread 14' for engagement with a fixed collar 17. The shaft 12 is journaled in the upright member or post 18 and is fixed against longitudinal motion relative thereto. It carries on its inner end a cam follower 16 which cooperates with a cam groove 19 on the inner surface of the traveling cam 14.

With the foregoing arrangement of elements, rotation of shaft 10 will effect rotation of the cam 14 which in turn is displaced longitudinally to the left or right depending on the direction of rotation of the shaft 10. Since the shaft 12 is fixed against longitudinal motion, displacement of the cam 14 coupled with rotation thereof will cause the cam follower 16 to shift its angular position. The extent and rate of change of this rotation of the cam follower and of course the shaft 12 is determined by the shape or slope of the groove 19. By a proper choice of the pitch of threads 14' and the slope of the groove 19, the shaft 12 can be made to rotate in accordance with a desired function of the angular motion imparted to the input shaft 10. This basic structure provides a simplified, dependable and highly accurate motion transforming device that is suitable for the reproduction of a wide variety of functions merely by providing a cylinder 14 having the desired thread pitch and groove contour to meet the requirements of a given situation. Since the accuracy of the transformation is a function of the precision with which threads 14' and groove 19 are formed, the employment of modern machining methods will enable the attainment of accuracies of a very high order.

While Fig. 1 illustrates the principle of operation of the invention, Fig. 2 shows a compact adaptor or motion transforming device wholly enclosed within an outer protective housing 20. The fixed end wall 21 of housing 20 includes a pair of journals 22 for rotatably holding the output shaft 23 and which in turn carries on its inner end a cylindrical member 24 that is fixedly secured to the shaft by a taper pin 25 or other suitable means. The removable wall 26 of the housing 20 carries an externally threaded sleeve 27 fixedly secured centrally of the wall 26 and extending inwardly thereof. This sleeve is provided with a pair of journals 28 for rotatably supporting the input or driven shaft 29.

Surrounding the sleeve 27 and threadedly engaged therewith is a cylinder or traveling cam 30 having a cam groove 31 in the outer surface and a pair of oppositely disposed internal slots 32 extending longitudinally thereof. These slots 32 are engaged by a transverse drive pin 29a carried on the inner end of the input shaft 29. Coupling between the traveling cam 30 and the cylindrical member 24 carried by the output shaft 23 is effected by a cam follower 33 mounted in the wall of said cylinder and extending into the cam groove 31.

This form of the invention not only provides a wholly enclosed adaptor or motion transforming device, but simplifies the manufacturing problem in that the cam groove 31 is on the outer surface of the cylinder 30. The operation is identical to that of the embodiment of Fig. 1 since rotation of the shaft 29 produces corresponding rotary motion of cam 30 which together with its longitudinal displacement effects a modified rotation of cylinder 24 and shaft 23.

A further embodiment of the invention is shown in Fig. 3 of the drawings and is arranged to meet the needs of certain applications that cannot be readily accomplished with the forms of the invention shown in Figs. 1 and 2. It however embodies the same fundamental principles of the first two figures except that the cam and cam follower of Fig. 3 act as a controlling or limiting means whereas in Figs. 1 and 2 they constitute the driving means. This procedure eliminates the high frictional forces between the follower pin and the traveling cam cylinder in cases where the groove has a very steep slope. Furthermore, since the cam and cam follower constitute controlling means rather than driving means relatively large amounts of power may be handled with the same high order of accuracy obtainable with low power devices.

The basic structure of this form of the invention is along the lines of that illustrated in Fig. 2 and has an outer housing 40 with one fixed end wall 41. This wall is provided with a pair of journals 42 for rotatably receiving and holding the output shaft 43. On the inner end of the output shaft is a cylindrical member 44 fixed in position thereon by a taper pin 45 or other suitable fastening means. The opposing end of housing 40 is closed by a plate 46 carrying the driving assembly.

This driving assembly comprises a fixed sleeve or cylinder 47 secured to and extending inwardly of the end wall 46 and having its outer surface threaded as indicated at 48. Rotatably mounted within this stationary sleeve 47 is a primary input drive shaft 49 which is in the form of a sleeve or tube. A second input shaft 50 is rotatably retained within the primary input shaft 49 and is coupled directly with the output shaft 43 by a sliding or slip clutch 51. In this way rotary motion imparted to the shaft 50 is directly transmitted to the output shaft 43 through the clutch 51.

Surrounding the fixed sleeve 47 is a traveling cam cylinder 52, threadably coupled with the sleeve 47 so that rotation of the cam cylinder will impart longitudinal motion to the cam cylinder relative to the fixed sleeve. In the inner surface of the traveling cam 52 are two opposed slots 53 and 54 extending longitudinally thereof for engagement with a pair of driving pins 55 and 56 carried by the primary input shaft 49. A groove 57 shaped in accordance with the desired function is cut in the outer surface of the cam cylinder 52 and engages the cam follower pin 58 carried by the cylinder 44. The engagement of the follower pin with the groove in the cam cylinder in this manner will limit and control the angular displacement of the output shaft under the influence of the secondary input shaft.

The output shaft will be held against movement by engagement of the cam follower pin with the groove in the cam cylinder and the slip clutch will permit the secondary input shaft to continue to rotate without movement of the output shaft. However, when the cam cylinder is rotated, the secondary input shaft supplies power to the output shaft and to the cam follower pin that will overcome any frictional forces that may tend to cause binding between the follower pin and the cam groove as in cases where the cam groove has a steep slope. For this purpose, it is desirable that the secondary input shaft be driven at a slightly higher speed than the primary input shaft.

In certain applications it may be desirable to eliminate the slots 53 and 54 in the cam cylinder 52 in which case the pins 55 and 56 would merely engage openings in the cam cylinder 52 and the driving sleeve 49 would be permitted to slide longitudinally of sleeve 47 as the cam cylinder 52 travels back and forth.

While only certain embodiments of the invention have been shown and described, it is apparent that modifications, changes and alterations may be made without departing from the true scope and spirit thereof.

I claim:

1. A function adaptor comprising an elongated housing having a pair of end walls, an externally threaded sleeve secured to one of said end walls and extending inwardly thereof, an input shaft journaled in said sleeve, a cylindrical cam surrounding and threadably engaging said sleeve, coupling means between said input shaft and said cylindrical cam, cam means on the outer surface of said cylindrical cam, an output shaft journaled in the other of said end walls and aligned with said input shaft and a cam follower coupled with said output shaft and engaging the cam means on said cylindrical cam.

2. A function adaptor according to claim 1 wherein said cam follower constitutes a cylindrical member with at least a portion thereof overlying said cylindrical cam and means carried by said member for engagement with said cam means.

3. A function adaptor according to claim 1 which includes a second input shaft, said second input shaft being rotatable independently of the first-mentioned input shaft, and a slip clutch connecting the second input shaft to the output shaft.

4. Motion transforming apparatus comprising a fixed member having a threaded portion, a rotatable cam member threadedly engaging the threaded portion of said fixed member, said cam member being movable longitudinally in response to rotation thereof, input means adapted for rotation of said cam member, a support, a rotatable output shaft, said output shaft being journalled in said support and held against longitudinal movement therein, and means for coupling the output shaft to said rotatable cam member, said coupling means including a cam follower carried by the output shaft and engaging with the rotatable cam member whereby rotation and longitudinal movement of the cam member will determine the direction and amount of angular movement imparted to the output shaft.

5. Means for modifying angular motion in accordance with a predetermined function comprising an input shaft, an output shaft, said output shaft being held against longitudinal movement, a fixed member having a cylindrical threaded portion, a movable cam representing a predetermined function threadably engaging the threaded portion of said fixed member, coupling means fastened to said input shaft and engaging said movable cam, said cam being movable longitudinally in response to rotation of said input shaft, and a cam follower connected to the output shaft and engaging with the movable cam whereby rotary motion of said input shaft will be transmitted to said output shaft to effect rotation thereof in accordance with the predetermined function.

6. A function adaptor comprising an input shaft, an output shaft, an externally threaded stationary sleeve surrounding said input shaft, a cylindrical traveling cam threadably engaging said sleeve and having a cam means on the outer surface thereof, a cam follower carried by said output shaft and engaging the cam means on said traveling cam, and coupling means between the input shaft and said cam.

7. A function adaptor comprising a stationary externally threaded sleeve, a tubular primary input shaft rotatably carried within said sleeve, a secondary input shaft rotatably carried within said primary input shaft, an output shaft mounted coaxial of said secondary input shaft, a slip clutch coupling said output shaft with said secondary input shaft, a traveling cam surrounding said stationary sleeve and threadably engaged therewith, coupling means between the traveling cam and the primary input shaft, and a cam follower carried by said output shaft and engaging said traveling cam.

8. A function adaptor for modifying angular motion in accordance with a predetermined function thereof comprising an input shaft, an output shaft, said shafts being held against longitudinal movement, a fixed member having a cylindrical threaded portion, a cylindrical function cam adapted to correspond to a predetermined function threadably engaging the threaded portion of said fixed member, said function cam having longitudinal slots in the surface thereof, coupling means fastened to said input shaft and engaging the slots in said function cam, said cam being movable longitudinally a distance determined by the pitch of the threaded portion of said fixed cylindrical member and by the amount of rotation of said input shaft, and a cam follower on the output shaft engaging said cam, said cam follower being movable in a circular path about the cam as the latter is rotated and displaced longitudinally.

9. A function adaptor comprising an output shaft, a first input shaft, a slip clutch connecting said first input shaft to said output shaft, a second input shaft, a fixed threaded member, a traveling cam threadably supported by said fixed threaded member, said traveling cam being coupled to said second input shaft and adapted to be rotated and displaced axially in response to rotation of said second input shaft, and a cam follower coupled to said output shaft, said cam follower engaging said traveling cam.

10. A function adaptor as defined in claim 9 wherein said traveling cam is cylindrical and includes a peripheral groove in the outer surface thereof, said cam follower engaging the peripheral groove in said traveling cam.

11. A function adaptor comprising a fixed member having a cylindrical threaded opening therein, an externally threaded cylindrical cam member threadably supported within the opening in said fixed member, said cam member having a groove corresponding to a predetermined function in the inner surface thereof, an input shaft coupled to said cam member, rotation of said input shaft producing rotation and longitudinal displacement of said cam member, supporting means, an output shaft journaled in said supporting means and held against longitudinal movements therein, and a cam follower coupled to said output shaft and engaging the groove in said cam member, said cam follower imparting rotary motion to said output shaft in response to rotation of said input shaft in accordance with the predetermined function.

References Cited in the file of this patent
UNITED STATES PATENTS

| | | |
|---|---|---|
| 959,119 | Davis | May 24, 1910 |
| 965,460 | Hoepfner | July 26, 1910 |
| 2,226,727 | Kroes | Dec. 31, 1940 |
| 2,247,562 | Sauten | July 1, 1941 |
| 2,612,312 | Clarke | Sept. 30, 1952 |
| 2,613,064 | Morton et al. | Mar. 30, 1954 |
| 2,748,616 | Foster et al. | June 5, 1956 |